(12) United States Patent
Ono et al.

(10) Patent No.: US 12,508,916 B2
(45) Date of Patent: Dec. 30, 2025

(54) CONTROL APPARATUS FOR ELECTRIC VEHICLE, ELECTRIC VEHICLE, AND RECORDING MEDIUM IN WHICH COMPUTER PROGRAM IS RECORDED

(71) Applicant: SUBARU CORPORATION, Tokyo (JP)

(72) Inventors: Tsubasa Ono, Tokyo (JP); Keiichi Watanabe, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 406 days.

(21) Appl. No.: 17/925,797

(22) PCT Filed: Sep. 29, 2021

(86) PCT No.: PCT/JP2021/035777
§ 371 (c)(1),
(2) Date: Apr. 6, 2023

(87) PCT Pub. No.: WO2023/053248
PCT Pub. Date: Apr. 6, 2023

(65) Prior Publication Data
US 2024/0217344 A1     Jul. 4, 2024

(51) Int. Cl.
*B60L 3/00* (2019.01)
*B60L 15/20* (2006.01)
*B60L 58/10* (2019.01)

(52) U.S. Cl.
CPC ............ *B60L 3/0084* (2013.01); *B60L 15/20* (2013.01); *B60L 58/10* (2019.02)

(58) Field of Classification Search
CPC ........ B60L 3/0084; B60L 58/10; B60L 15/20; B60L 3/003; B60L 3/0061; B60L 2240/423; B60L 2240/549
See application file for complete search history.

(56) References Cited

U.S. PATENT DOCUMENTS

2013/0338866 A1* 12/2013 Ozaki ................... B60L 3/0061
                                                        701/22
2016/0018287 A1*  1/2016 Syed ....................... H02P 21/20
                                                        73/114.15
(Continued)

FOREIGN PATENT DOCUMENTS

JP       2016-043892 A      4/2016
JP       2017-153358 A      8/2017
JP         2017153358  *    8/2017   ............. Y02T 10/72

OTHER PUBLICATIONS

International Search Report in the corresponding International Application No. PCT/JP2021/035777 dated Dec. 21, 2021, with English Translation (4 pages).

*Primary Examiner* — Michael J Zanelli
(74) *Attorney, Agent, or Firm* — Rimon P.C.

(57) ABSTRACT

A control apparatus for an electric vehicle acquires a detection value of an output current of a battery to be detected by a first sensor, and a detection value of a drive torque to be transmitted to a wheel and to be detected by a second sensor, calculates an actual torque-current characteristic that indicates a relationship between a supply current to be supplied to an inverter circuit and the drive torque to be transmitted to the wheel, and determines a shift between a reference torque-current characteristic and the calculated actual torque-current characteristic, in which the reference torque-current characteristic is a characteristic in which a relationship between a torque command value of a drive motor and a target supply current to be supplied to the drive motor is set in advance.

9 Claims, 8 Drawing Sheets

(56) References Cited

U.S. PATENT DOCUMENTS

2020/0148064 A1\* 5/2020 Gonzales ............ G01R 15/202
2020/0298776 A1\* 9/2020 Nunokawa ............ B60R 16/03
2021/0276222 A1\* 9/2021 Datema .................. G01S 19/52
2023/0006598 A1\* 1/2023 Kawadu ................... H02P 5/74

\* cited by examiner

[FIG. 1]
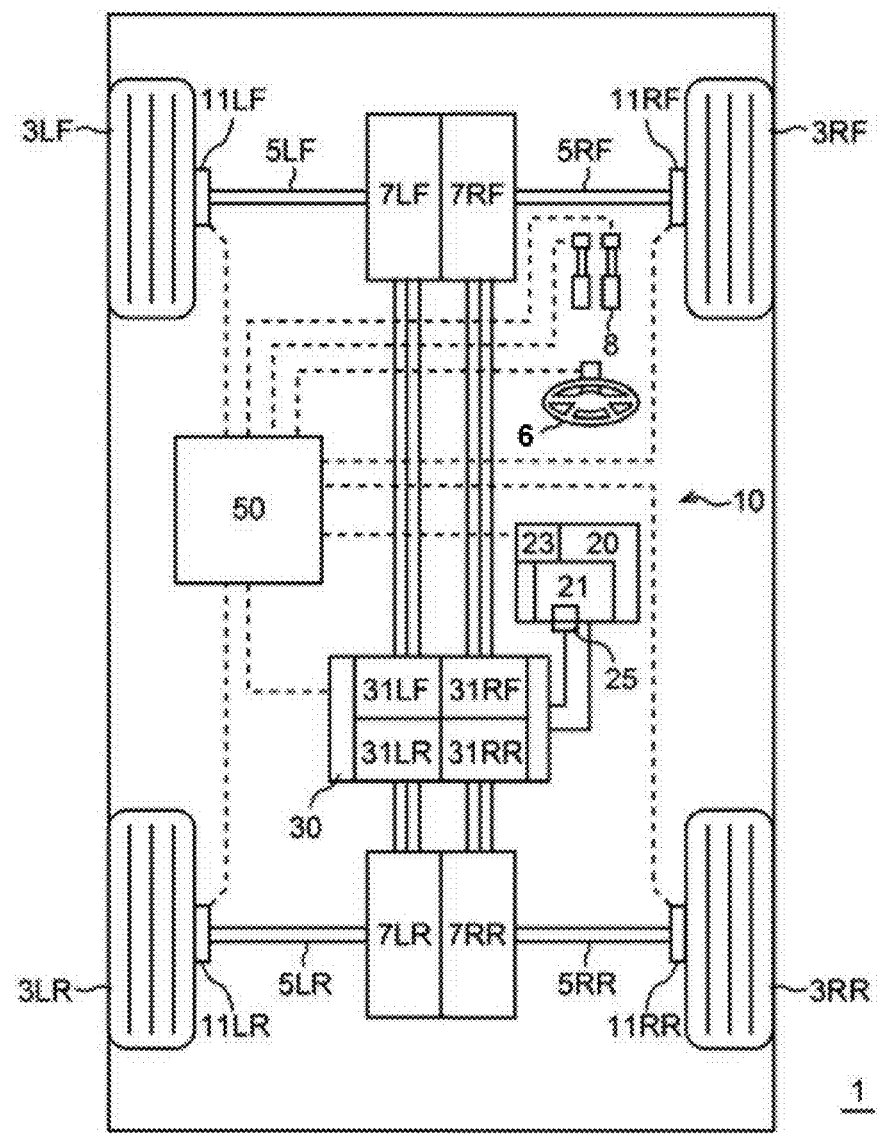

[FIG. 2]

| No. | Accelerator Pedal Sensor (Torque Request) | Current Sensor (Battery Current) | Communication System / High-Voltage Circuit | Torque Control Unit | | Battery Control Unit | Others, such as Tire | Abnormality Determination |
|---|---|---|---|---|---|---|---|---|
| | | | | Inverter | Motor | Battery | | |
| 1 | PRESENT | PRESENT | | ○ | ○ | ○ | | NO ABNORMALITY |
| 2 | PRESENT | ABSENT | × | | INDETERMINABLE | | — | COMMUNICATION SYSTEM ABNORMAL |
| 3 | ABSENT | ABSENT | | | INDETERMINABLE | | | NO ABNORMALITY |

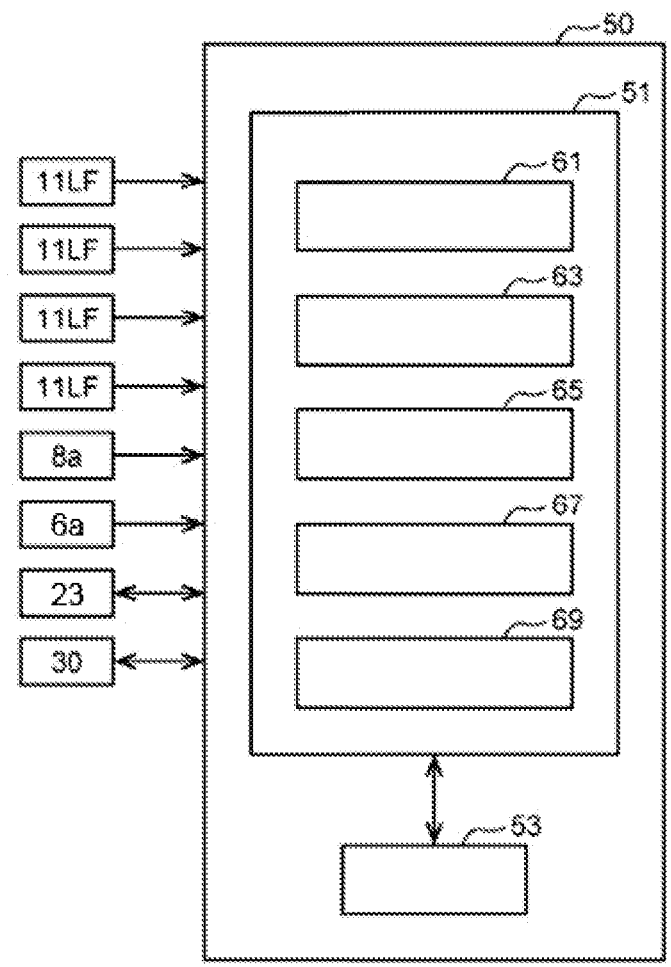
[FIG. 3]

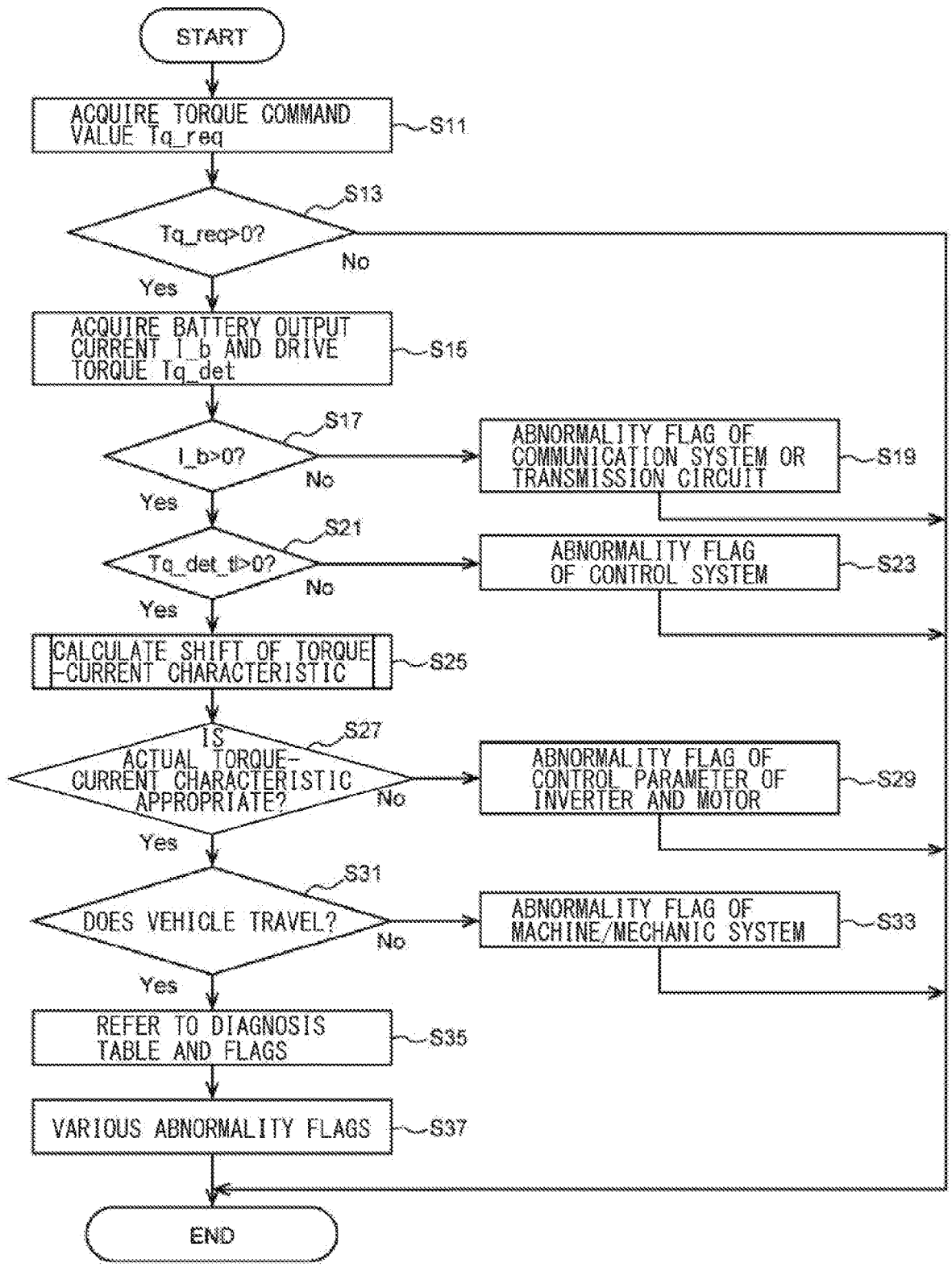
[FIG. 4]

[ FIG. 5 ]
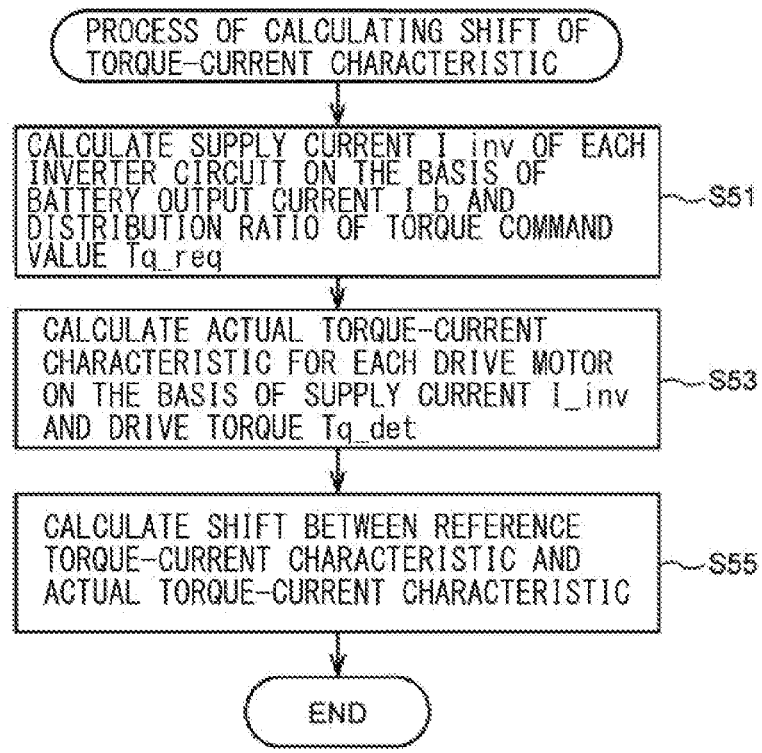
[ FIG. 6 ]
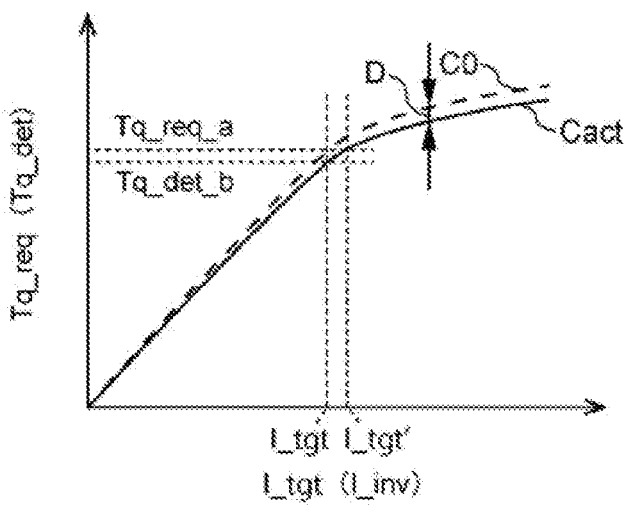

[FIG. 7]

| No. | | Force Sensor | | Accelerator Pedal Sensor | Current Sensor | Communication System/High-Voltage Circuit | Torque Control Unit | | Battery Control Unit | Others, Such As Tire | Abnormality Determination |
|---|---|---|---|---|---|---|---|---|---|---|---|
| | | Drive Torque | Drive Force | Torque Request | Battery Current | | Inverter | Motor | Battery | | |
| 1 | a | PRESENT | PRESENT | PRESENT | PRESENT | O | O | O | O | O | NORMAL |
| | b | PRESENT | ABSENT | PRESENT | PRESENT | O | O | O | O | X | MACHINE/MECHANIC SYSTEM ABNORMAL |
| | c | ABSENT | PRESENT | PRESENT | PRESENT | O | X | X | O | X | DRIVE SYSTEM ABNORMAL |
| | d | ABSENT | ABSENT | PRESENT | PRESENT | O | X | X | O | — | DRIVE SYSTEM ABNORMAL |
| 2 | | PRESENT OR ABSENT | | PRESENT | ABSENT | X | O | O | O | — | COMMUNICATION SYSTEM ABNORMAL |
| 3 | a | PRESENT | PRESENT | ABSENT | ABSENT | X | △ | △ | △ | — | COMMUNICATION SYSTEM ABNORMAL |
| | b | ONE OF THEM IS PRESENT | | ABSENT | ABSENT | X | △ | △ | △ | — | COMMUNICATION SYSTEM ABNORMAL |
| | c | ABSENT | ABSENT | ABSENT | ABSENT | O | O | O | O | O | NORMAL |

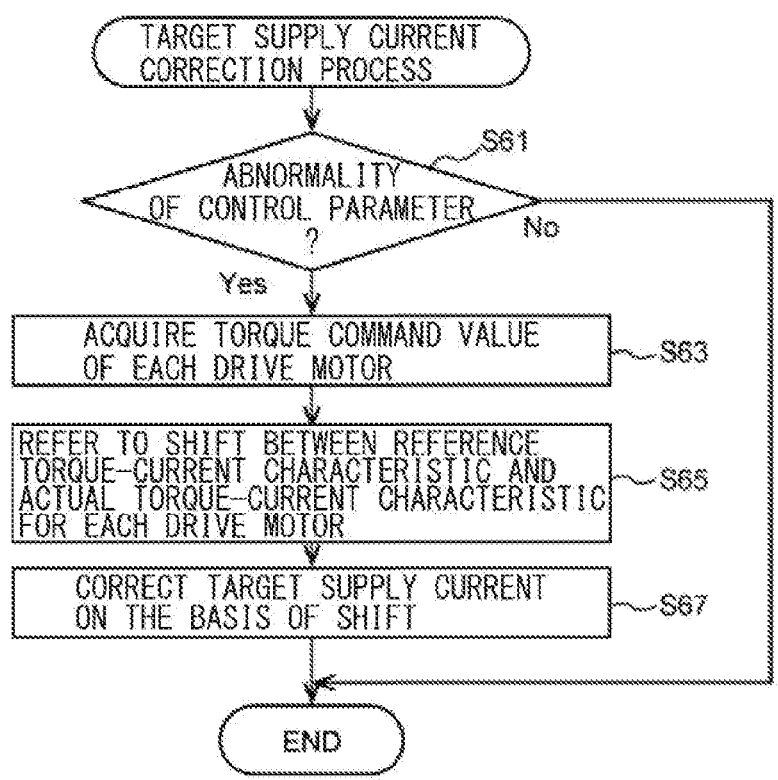

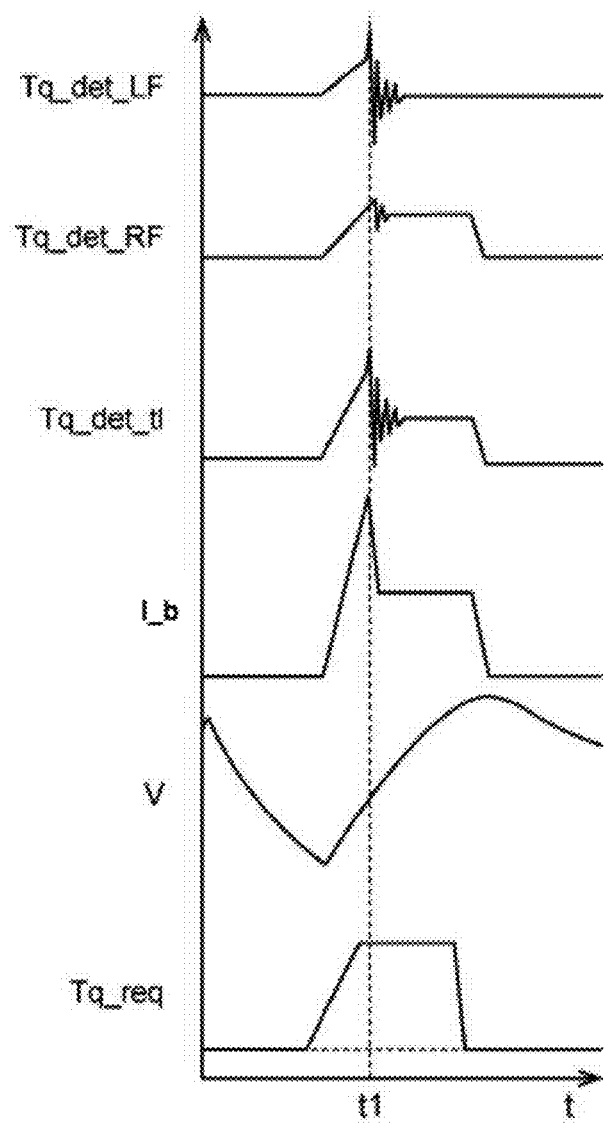
[ FIG. 9 ]

CONTROL APPARATUS FOR ELECTRIC VEHICLE, ELECTRIC VEHICLE, AND RECORDING MEDIUM IN WHICH COMPUTER PROGRAM IS RECORDED

CROSS REFERENCE TO RELATED APPLICATIONS

This application is the U.S. National Phase under 35 U.S.C. § 371 of International Application No. PCT/JP2021/035777, filed on Sep. 29 2021, the entire contents of each are hereby incorporated by reference.

TECHNICAL FIELD

The disclosure relates to a control apparatus for an electric vehicle, to an electric vehicle, and to a recording medium in which a computer program is recorded.

BACKGROUND ART

In recent years, electrification of an automobile is in progress, as can be seen by a hybrid electric vehicle and a battery electric vehicle. An electric vehicle includes a drive motor that outputs a drive force, and an inverter that drives the drive motor. For such an electric vehicle, a system that detects an error of the drive motor, the inverter, or peripheral devices thereof is necessary.

For example, Patent Literature 1 discloses a control apparatus for a hybrid vehicle that includes a motor/generator for a drive source. The control apparatus is provided with a motor current feedback control circuit that performs a control of a motor current to be supplied to the motor/generator on the basis of a motor command torque, and a motor control system malfunction detection circuit that detects a malfunction of a motor control system on the basis of a deviation torque between the motor command torque and a motor torque. The control apparatus of Patent Literature 1 is configured to determine a motor torque deviation malfunction, on the basis of a malfunction determination value of the deviation torque and a malfunction determination time during which a state in which the malfunction determination value is exceeded is continued.

CITATION LIST

Patent Literature

Patent Literature 1: Japanese Unexamined Patent Application Publication No. 2016-043892

SUMMARY OF INVENTION

Problem to be Solved by the Invention

A malfunction detection function by a control apparatus described in Patent Literature 1 described above detects a malfunction of a control system of a drive motor using a deviation torque, which is an absolute value of a difference between a torque command value required for the drive motor and an output torque of the drive motor calculated from a motor current supplied from an inverter to the drive motor. In other words, the malfunction detection function determines whether a current corresponding to the torque command value is appropriately supplied to the drive motor.

However, an abnormality of a control system of the drive motor can occur by various factors, such as an abnormality of a component part or an abnormality of a control parameter. Accordingly, even if an appropriate current is supplied to the drive motor, a drive torque to be outputted from the drive motor does not sometimes become an appropriate torque that corresponds to the torque command value. The malfunction detection function by the control apparatus of Patent Literature 1 is unable to determine whether an appropriate drive torque that corresponds to the torque command value is outputted from the drive motor. In addition, simply comparing the torque command value and the drive torque to be outputted from the drive motor makes it not possible to sense a shift between a control parameter used for a control of the drive motor and a control parameter that allows for an output of the appropriate drive torque from the drive motor.

The disclosure has been made in view of an issue described above, and it is an object of the disclosure to provide a control apparatus for an electric vehicle, an electric vehicle, and a recording medium in which a computer program is recorded, that make it possible to determine an abnormality of a control parameter of a drive motor.

Means for Solving the Problem

To solve the above-described problem, an aspect of the disclosure provides a control apparatus for an electric vehicle to be applied to a control system of the electric vehicle. The electric vehicle includes at least one drive motor configured to output a drive torque, and an inverter circuit configured to drive the drive motor. The control apparatus includes: one or more processors; and one or more memories coupled to the one or more processors to allow for communication with the one or more processors. The one or more processors are configured to: acquire a detection value of an output current of a battery to be detected by a first sensor, and a detection value of the drive torque to be transmitted to each of one or more wheels and to be detected by a second sensor; calculate an actual torque-current characteristic that indicates a relationship between a supply current to be supplied to the inverter circuit and the drive torque; and determine a shift between a reference torque-current characteristic and the calculated actual torque-current characteristic. The reference torque-current characteristic is a characteristic in which a relationship between a torque command value of the drive motor and a target supply current to be supplied to the drive motor is set in advance.

In addition, to solve the above-described problem, another aspect of the disclosure provides a control apparatus for an electric vehicle to be applied to a control system of the electric vehicle. The electric vehicle includes at least one drive motor configured to output a drive torque, and an inverter circuit configured to drive the drive motor. The control apparatus includes: an acquisition unit configured to acquire a detection value of an output current of a battery to be detected by a first sensor, and a detection value of the drive torque to be transmitted to each of one or more wheels and to be detected by a second sensor; a torque-current characteristic calculation unit configured to calculate a torque-current characteristic that indicates a relationship between the output current of a battery and the drive torque; and a determination unit configured to determine a shift between a preset reference torque-current characteristic and the torque-current characteristic.

In addition, to solve the above-described problem, yet another aspect of the disclosure provides an electric vehicle mounted with a control system of the electric vehicle. The electric vehicle includes at least one drive motor configured to output a drive torque, an inverter circuit configured to drive the drive motor, and a force sensor configured to detect a force that acts on one or more wheels. The electric vehicle further includes a control apparatus configured to control the control system of the electric vehicle. The control apparatus includes: one or more processors; and one or more memories coupled to the one or more processors to allow for communication with the one or more processors. The one or more processors are configured to acquire a detection value of an output current of a battery to be detected by a first sensor, and a detection value of the drive torque to be transmitted to each of the one or more wheels and to be detected by a second sensor, calculate a torque-current characteristic that indicates a relationship between the output current of the battery and the drive torque, and determine a shift between a preset reference torque-current characteristic and the torque-current characteristic.

In addition, to solve the above-described problem, yet another aspect of the disclosure provides a recording medium in which a computer program is recorded. The computer program is to be applied to a control system of an electric vehicle. The electric vehicle includes at least one drive motor configured to output a drive torque, and an inverter circuit configured to drive the drive motor. The computer program causes one or more processors to execute a process. The process includes: acquiring a detection value of an output current of a battery to be detected by a first sensor, and a detection value of the drive torque to be transmitted to each of one or more wheels and to be detected by a second sensor, calculating an actual torque-current characteristic that indicates a relationship between a supply current to be supplied to the inverter circuit and the drive torque to be transmitted to the wheel, and determining a shift between a reference torque-current characteristic and the calculated actual torque-current characteristic. The reference torque-current characteristic is a characteristic in which a relationship between a torque command value of the drive motor and a target supply current to be supplied to the drive motor is set in advance.

Effects of the Invention

As described above, according to the disclosure, it is possible to determine an abnormality of a control parameter of a drive motor.

BRIEF DESCRIPTION OF DRAWINGS

FIG. 1 is a schematic diagram illustrating a configuration example of an electric vehicle provided with a control system that includes a control apparatus for an electric vehicle according to an embodiment of the disclosure.

FIG. 2 is a diagnosis table for distinguishing an abnormality on the basis of a torque command value and an output current value of a battery in a control system provided with no force sensor.

FIG. 3 is a block diagram illustrating a configuration example of the control apparatus for the electric vehicle according to the embodiment.

FIG. 4 is a flowchart illustrating a diagnosis process to be executed by the control apparatus for the electric vehicle according to the embodiment.

FIG. 5 is a flowchart illustrating a process of determining a shift of a torque-current characteristic by the control apparatus for the electric vehicle according to the embodiment.

FIG. 6 is an explanatory diagram illustrating a shift of the torque-current characteristic.

FIG. 7 is a diagnosis table for distinguishing an abnormality by the control apparatus for the electric vehicle according to the embodiment.

FIG. 8 is a flowchart illustrating an example of a target supply current correction process by the control apparatus for the electric vehicle according to the embodiment.

FIG. 9 is an explanatory diagram illustrating an example in which an abnormality of one drive motor is generated.

MODES FOR CARRYING OUT THE INVENTION

In the following, a preferred embodiment of the disclosure is described in detail with reference to the accompanying drawings. It should be noted that, throughout the present description and the drawings, elements having substantially the same function and configuration are denoted with the same reference numerals to avoid any redundant description.

<1. Configuration of Electric Vehicle>

First, described is an example of a configuration of an electric vehicle provided with a control system that includes a diagnosis device of the electric vehicle according to an embodiment of the disclosure.

FIG. 1 is a schematic diagram illustrating a configuration example of an electric vehicle 1 provided with a control system 10. The electric vehicle 1 illustrated in FIG. 1 is a four-wheel automobile provided with four wheels 3. The electric vehicle 1 is not limited to the four-wheel automobile, and may be any other vehicle including a two-wheel automobile and a commercial vehicle such as a bus or a truck.

It should be noted that, in FIG. 1, characters LF (left front), RF (right front), LR (left rear), and RR (right rear) are affixed to the ends of reference signs for the four wheels 3 and, for example, drive motors 7 and force sensors 11 that are provided for the respective wheels 3. In addition, in the following description, the affixed characters LF, RF, LR, and RR are omitted as appropriate unless otherwise required in particular for distinction.

The control system 10 of the electric vehicle 1 includes the force sensor 11, the drive motor 7, an inverter unit 30, a battery unit 20, and a control apparatus 50. The control system 10 supplies electric power stored in a battery 21 provided in the battery unit 20 to the drive motor 7 and causes a drive torque outputted from the drive motor 7 to be transmitted to the wheels 3 to thereby allow the electric vehicle 1 to travel.

The battery unit 20 includes the battery 21, a battery management device 23, and a current sensor 25. The battery 21 is a chargeable and dischargeable secondary battery. For example, the battery 21 may be a lithium-ion battery whose rated output is 200 V. However, a type and a rated output of the battery 21 are not particularly limited. The battery 21 is coupled to the drive motor 7 via the inverter unit 30, and stores the electric power to be supplied to the drive motor 7. The current sensor 25 detects an output current of the battery 21. The current sensor 25 corresponds to a first sensor according to a technique of the disclosure. Besides, the battery unit 20 includes a voltage sensor that detects an output voltage of the battery 21 and a temperature sensor that detects a temperature of the battery 21. The battery management device 23 acquires, for example, an open voltage, the output voltage, an output current, and the battery temperature of the battery 21, and sends those pieces of information to the control apparatus 50.

The drive motor 7 is coupled to the wheels 3 via an axle 5, and outputs the drive torque to be transmitted to the wheels 3. For example, the drive motor 7 may be a three-phase AC radial motor or axial gap motor, although the number of phases and the type of motor are not particularly limited. The drive motor 7 has a function of performing regenerative electric power generation as a result of receiving a rotation torque from the wheel 3 side upon deceleration of the electric vehicle 1 to thereby generate a braking force.

In the electric vehicle 1 according to the present embodiment, one drive motor 7 is coupled to one wheel 3. However, the electric vehicle 1 may have two drive motors including a front wheel drive motor that causes the drive torque to be transmitted to the left front wheel 3LF and the right front wheel 3RF and a rear wheel drive motor that causes the drive torque to be transmitted to the left rear wheel 3LR and the right rear wheel 3RR. In addition, the electric vehicle 1 may have one drive motor that causes the drive torque to be transmitted to the four wheels 3. In a case of a configuration in which the drive torque is to be transmitted from one drive motor to the plurality of wheels 3, a differential mechanism may be provided between the right and the left axels or between front and rear drive shafts.

Each of the wheels 3 is provided with the force sensor 11 that detects a force that acts on the wheel 3. The force sensor 11 is configured to detect at least the drive torque (the rotation torque) outputted from the drive motor 7 and transmitted to the wheel 3 or the drive force in a front-rear direction of the vehicle (the drive force). The force sensor 11 corresponds to a second sensor according to a technique of the disclosure. For example, the force sensor 11 may be a sensor that detects component forces in an x direction (a direction orthogonal to an axial direction of the axle and a vehicle height direction), a y direction (the axial direction of the axle), and a z direction (the vehicle height direction) that act on the axle 5 that supports the wheels 3, and moments around respective axes of the x direction, the y direction, and the z direction. In this case, the moment around the axis in the y direction corresponds to the drive torque to be outputted from the drive motor 7. In addition, the component force in the x direction corresponds to the drive force of the wheel 3. However, the type of force sensor 11 is not limited. For example, the force sensor 11 may be a sensor that detects the rotation torque that acts on a wheel of the wheel 3. A sensor signal to be outputted from the force sensor 11 is inputted to the control apparatus 50.

The inverter unit 30 includes inverter circuits 31LF, 31RF, 31LR, and 31RR that supply electric power to the respective drive motors 7LF, 7RF, 7LR, and 7RR. Each of the inverter circuits 31 converts direct-current electric power swept from the battery 21 into three-phase alternating-current electric power and supplies the three-phase alternating-current electric power to the drive motor 7. In addition, the inverter circuit 31 converts three-phase alternating-current electric power generated by regeneration by the drive motor 7 into direct-current electric power and supplies the direct-current electric power to the battery 21. The inverter unit 30 may include a step-up step-down circuit. The driving of the inverter unit 30 is controlled by the control apparatus 50.

The control apparatus 50 functions as a device that diagnoses the control system 10 as a result of execution of a computer program by one or a plurality of processors. In addition, the control apparatus 50 according to the present embodiment has a function of performing a signal process through acquiring the sensor signal of the force sensor 11, a function of calculating a torque command value through acquiring an operation amount of an accelerator pedal 8 and a steering angle of the steering wheel 6, a function of managing electric power of the control system 10 through acquiring information such as the output voltage or the output current of the battery 21 from the battery management device 23, and a function of controlling the driving of the inverter unit 30 on the basis of the torque command value. The control apparatus 50 may be unitized as a single device that achieves the plurality of functions, or may be configured by a plurality of devices so coupled to each other as to allow for a mutual communication.

The computer program is a computer program for causing a processor such as CPU (Central Processing Unit) to execute a later-described operation to be executed by the control apparatus 50. The computer program to be executed by the processor may be recorded in a recording medium that functions as a storage (a memory) 53 provided in the control apparatus 50, or may be recorded in a recording medium provided in the control apparatus 50 or in any external recording medium attachable to the control apparatus 50.

The recording medium in which the computer program is to be recorded may be: a magnetic medium such as a hard disk, a floppy disk, or a magnetic tape; an optical recording medium such as CD-ROM (Compact Disk Read Only Memory), DVD (Digital Versatile Disk), or Blu-ray (Registered Trademark); a magneto-optic medium such as a floptical disk; a storage element such as ROM (Read Only Memory) or RAM (Random Access Memory); a flash memory such as SSD (Solid State Drive) or an USB (Universal Serial Bus) memory; or any other medium configured to contain a program.

<2. Control Apparatus>

A configuration example of the electric vehicle 1 and the control system 10 has been described up to here. In the following, the control apparatus 50 is described in detail.

(2-1. Outline)

First, described is an outline of a process to be executed by the control apparatus 50.

In general, a vehicle is mounted with a large number of control apparatuses, and each of the control apparatuses has a self-diagnosis function that detects an abnormality of modules controlled by the respective control apparatuses on the basis of, for example, an output current and an output voltage. In a control system of an electric vehicle, a control apparatus responsible for a control of an inverter unit and a drive motor has an abnormality diagnosis function of the modules. It is necessary to establish duplexing such that at least an abnormality directly linked to safety performance is detectable by any other control apparatus in a case where the abnormality diagnosis function has a trouble.

In the control system of the electric vehicle, the torque command value that indicates an acceleration request for the electric vehicle is an input to a control system, and the drive torque to be transmitted to the wheels is an output from the control system. In the control system, elements interposed between the input and the output of the control system are the "communication", the "inverter unit 30", the "drive motor 7", and the "battery 21", and a highly accurate function that is able to detect an abnormality generated at any of those elements is required.

For example, in a control system in which an electric vehicle is not provided with a force sensor, a control apparatus that is responsible for a control of an inverter unit and a drive motor monitors "no abnormality", "an abnormality of an inverter unit", "an abnormality of a drive motor", and "a rotation speed of a drive motor". In addition, a battery management device that is responsible for a control of a battery unit monitors "an abnormality of a battery" and "an output current of the battery". Further, a control apparatus that is responsible for a calculation of a torque command value of the electric vehicle monitors "the torque command value".

Here, even if the output current of the battery with respect to the torque command value and the rotation speed of the drive motor with respect to the torque command value are monitored in a situation in which an abnormality is not detected in each of the control apparatuses, monitoring the rotation speed of the drive motor as an output with respect to an input of the torque command value is not appropriate. Accordingly, it is not possible to determine an appropriate output current value of the battery with respect to the torque command value. Hence, in order to establish duplexing of the abnormality diagnosis of the inverter unit and the drive motor, it is only possible to make the determination on the basis of whether the output current value of the battery is not zero in a case where the torque command value is not zero. In this case, it is not possible to detect the abnormality of the inverter unit and the drive motor regardless of whether the drive motor is in rotation, even if the torque command value is not zero and the output current value of the battery is not zero. Needless to say, it is not possible to detect an abnormality of a control parameter of the inverter unit as well.

FIG. 2 is a diagnosis table for distinguishing an abnormality in the control system provided with no force sensor, in a case where only the torque command value and the output current value of the battery are detectable and where the control apparatus that controls each module does not detect an abnormality by a self-diagnosis. If an output current of the battery is zero despite the fact that the torque command value is not zero in a case where it is not possible to detect a drive torque to be transmitted to a wheel that serves as an output of a control system, an abnormality by each self-diagnosis is not detected; accordingly, it is possible to make determination as an abnormality of a communication system between control apparatuses (No. 2). Meanwhile, in a case where the torque command value and the output current of the battery are not both zero or both zero, whether the drive torque to be transmitted to the wheel is appropriate is uncertain even if an abnormality is present at anywhere of a system as a whole; accordingly, it is not possible to detect the abnormality (No. 1 and No. 3). In this case, a simple diagnosis result is "no abnormality".

In contrast, the control system 10 of the electric vehicle 1 according to the present embodiment includes the force sensor (the second sensor) 11 configured to detect the drive torque to be transmitted to the wheels 3 that serve as the output of the control system. The control apparatus 50 establishes the duplexing of the abnormality diagnosis of the control system 10 through the use of information of the drive torque to be detected by the force sensor 11. In particular, it is possible for the control apparatus 50 to detect the abnormality of the control parameter for controlling the driving of the drive motor 7.

(2-2. Configuration of Control Apparatus)

FIG. 3 is a block diagram illustrating an example of a configuration of the control apparatus 50. The control apparatus 50 includes one or a plurality of processors, and one or a plurality of memories, such as RAM or ROM, that is so coupled to the processor as to allow for communication with the processor. For example, all or a part of the control apparatus 50 may be so configured as to be updatable by, for example, a firmware, or may be a program module executed by a command from the processor.

The force sensors 11 provided for the respective wheels 3 are coupled to the control apparatus 50. In addition, an accelerator pedal sensor 8a that detects the operation amount of the accelerator pedal 8 and a steering angle sensor 6a that detects a steering angle of a steering wheel 6 are coupled to the control apparatus 50. Further, the battery management device 23 and the inverter unit 30 are coupled to the control apparatus 50. The control apparatus 50 and respective devices are coupled to each other via a dedicated line or a communication bus such as CAN (Controller Area Network).

The control apparatus 50 includes a processing unit 51 and the storage 53. The processing unit 51 includes a command torque calculation unit 61, a battery information acquisition unit 63, a force sensor output detection unit 65, a torque output control unit 67, and a diagnosis unit 69. The processing unit 51 is one or a plurality of processors such as CPU. The respective units including the command torque calculation unit 61, the battery information acquisition unit 63, the force sensor output detection unit 65, the torque output control unit 67, and the diagnosis unit 69 are functions that are to be achieved as a result of execution of a computer program by the processor. However, a part of the command torque calculation unit 61, the battery information acquisition unit 63, the force sensor output detection unit 65, the torque output control unit 67, and the diagnosis unit 69 may be configured by an analog circuit.

The storage 53 includes one or a plurality of storage elements such as RAM or ROM, or includes a recording medium such as a hard disk or SSD. The storage 53 contains a computer program to be executed by the processing unit 51, various parameters to be used for the execution of the computer program. Besides, the storage 53 contains, for example, acquired data and data on a calculation result.

(2-2-1. Command Torque Calculation Unit)

The command torque calculation unit 61 calculates a torque command value Tq_req, on the basis of the operation amount of the accelerator pedal 8 indicated by the sensor signal outputted from the accelerator pedal sensor 8a. For example, the command torque calculation unit 61 refers to a command torque map that indicates a relationship between the operation amount of the accelerator pedal and the torque command value to determine the torque command value Tq_req that corresponds to the operation amount of the accelerator pedal 8. The torque command value Tq_req to be determined here is the sum of torque command values Tq_req_LF, Tq_req_RF, Tq_req_LR, and Tq_req_RR that are caused to be outputted from the four drive motors 7LF, 7RF, 7LR, and 7RR.

In addition, the command torque calculation unit 61 allocates the torque command value Tq_req to each of the drive motors 7LF, 7RF, 7LR, and 7RR, and calculates the torque command values Tq_req_LF, Tq_req_RF, Tq_req_LR, and Tq_req_RR that are caused to be outputted from the respective drive motors 7LF, 7RF, 7LR, and 7RR. In the electric vehicle 1 of the present embodiment, one drive motor 7 is provided for each of the wheels 3. Accordingly, the command torque calculation unit 61 so calculates the torque command values Tq_req_LF, Tq_req_RF, Tq_req_LR, and Tq_req_RR for the respective drive motors 7 as to cause an influence of a difference of radius between inner wheels or a difference of radius between outer wheels generated upon turning traveling to be small and to further cause an influence of an oversteer or an understeer to be small.

However, in a case where the differential mechanism is provided between the right and the left axles or between the front and the rear drive shafts, such as in a case where the left front wheel 3LF and the right front wheel 3RF are to be driven by one front wheel drive motor, in a case where the left rear wheel 3LR and the right rear wheel 3RR are to be driven by one rear wheel drive motor, or in a case where the four wheels 3 are to be driven by one drive motor, the drive torque may be evenly allocated to each of the drive motors. In addition, in a case where the electric vehicle 1 is a vehicle that allows for automated driving, the command torque calculation unit 61 calculates the torque command values Tq_req_LF, Tq_req_RF, Tq_req_LR, and Tq_req_RR of the respective drive motors 7, on the basis of the torque command value Tq_req calculated by the control apparatus that controls the automated driving.

(2-2-2. Battery Information Acquisition Unit)

The battery information acquisition unit 63 acquires information on the battery 21 to be transmitted from the battery management device 23. The information on the battery 21 includes the open voltage, the output voltage, the output current, and the temperature of the battery 21. In the present embodiment, the battery information acquisition unit 63 at least acquires information on a detection value I_b of the output current of the battery 21 to be detected by the current sensor (the first sensor) 25.

(2-2-3. Force Sensor Output Detection Unit)

The force sensor output detection unit 65 detects a force that acts on each of the wheels 3, on the basis of the sensor signal to be outputted from the force sensor (the second sensor) 11. For example, in a case where the force sensor 11 is a sensor that detects the six component forces described above, the force sensor output detection unit 65 acquires the sensor signal (the voltage value) that indicates the component forces in the respective xyz directions and the moments around respective axes in the respective xyz directions to be outputted from the force sensor 11. The force sensor output detection unit 65 may be configured to acquire a signal to be outputted from an amplification circuit that amplifies the sensor signal. The force sensor output detection unit 65 at least detects the moment that acts around an axis in the y direction that corresponds to a drive torque Tq_det outputted from the drive motor 7. In addition, in the present embodiment, the force sensor output detection unit 65 detects the component force in the x direction that corresponds to a drive force F_det of the wheel 3.

(2-2-4. Torque Output Control Unit)

The torque output control unit 67 controls the driving of each of the inverter circuits 31LF, 31RF, 31LR, and 31RR, and controls the driving (power running) and the regeneration of each of the drive motors 7LF, 7RF, 7LR, and 7RR. In a case of causing the drive torque to be outputted from the drive motor 7, the torque output control unit 67 refers to information on a reference torque-current characteristic map that indicates the torque command value and the supply current to set target supply currents I_tgt_LF, I_tgt_RF, I_tgt_LR, and I_tgt_RR of the respective drive motors 7LF, 7RF, 7LR, and 7RR on the basis of the torque command values Tq_req_LF, Tq_req_RF, Tq_req_LR, and Tq_req_RR determined by the command torque calculation unit 61 and to control the driving of each of the inverter circuits 31LF, 31RF, 31LR, and 31RR. Thus, a three-phase AC current is suppled to each of the drive motors 7, and the drive torque is outputted to each of the wheels 3 as a result of the driving of the drive motors 7.

In addition, in the present embodiment, when a shift between the preset reference torque-current characteristic map and an actual torque-current characteristic that determines a relationship between the supply current and the drive torque is determined by the diagnosis unit 69, the torque output control unit 67 may correct the target supply currents I_tgt_LF, I_tgt_RF, I_tgt_LR, and I_tgt_RR of the respective drive motors 7LF, 7RF, 7LR, and 7RR by using information on the shift. Thus, the driving of the inverter circuit 31 is so controlled that the drive torques corresponding to the torque command values Tq_req_LF, Tq_req_RF, Tq_req_LR, and Tq_req_RR are outputted from the respective drive motors 7LF, 7RF, 7LR, and 7RR.

(2-2-5. Diagnosis Unit)

The diagnosis unit 69 executes a process that diagnoses the control system 10. In the present embodiment, the diagnosis unit 69 is configured to determine an abnormality of the control system 10, by using information on the drive torque Tq_det to be outputted from the drive motor 7 and detected by the force sensor (the second sensor) 11. Specifically, the diagnosis unit 69 distinguishes between an abnormality of a drive system, an abnormality of a communication system, and an abnormality of a machine/mechanic system, on the basis of a detection result of the force sensor 11, a detection result of the accelerator pedal sensor 8a, and a detection result of the current sensor 25. The abnormality of the drive system is an abnormality generated at the inverter unit 30 and the drive motor 7. The abnormality of the communication system is an abnormality generated at, for example, communication and transmission circuits between various sensors and the control apparatus 50, and an abnormality generated at communication and transmission circuits between the control apparatuses in a case where the control apparatus 50 is configured by the plurality of control apparatuses. The abnormality of the machine/mechanic system is an abnormality in which the electric vehicle 1 is unable to travel even when the drive torque is transmitted to the wheels 3, such as stuck of the wheels 3.

In particular, the diagnosis unit 69 calculates an actual torque-current characteristic that indicates a relationship between the detection value I_b of the output current of the battery detected by the current sensor (the first sensor) 25 and the drive torque Tq_det to be outputted from the drive motor 7 and detected by the force sensor (the second sensor) 11. Further, the diagnosis unit 69 determines a shift between the preset reference torque-current characteristic and the thus-calculated actual torque-current characteristic. Thus, the diagnosis unit 69 is configured to determine the abnormality of the control parameter directed to the control of the driving of the drive motor 7.

The abnormality of the control parameter is a state in which the reference torque-current characteristic used in a case of setting the supply current to each inverter circuit 31 on the basis of the torque command value Tq_req and a characteristic of the drive torque of each of the drive motors 7 with respect to the current actually supplied to each inverter circuit are not coincident with each other (shifted from each other), such as a state in which an output efficiency of the drive torque with respect to the supply current to the inverter circuit 31 is decreased, or a state in which an electrical resistance is increased due to generation of heat, for example.

In the following, a diagnosis process operation of the control system 10 to be performed by the diagnosis unit 69 is described in detail.

(2-3. Diagnosis Process Operation)

A description is given next, with reference to a flowchart, of an example of a specific process operation to be performed by the control apparatus 50 of the electric vehicle 1 according to the present embodiment. FIG. 4 is a flowchart illustrating a diagnosis process to be executed by the control apparatus 50. It is to be noted that the diagnosis process described below may be executed constantly during activation of the control system 10, or may be so set as to be executed at any appropriate timing, such as at the time of startup of the control system 10, at each predetermined traveling distance, or at a predetermined traveling time.

First, the diagnosis unit 69 of the processing unit 51 acquires the torque command value Tq_req calculated by the command torque calculation unit 61 (step S11). Thereafter, the diagnosis unit 69 determines whether the acquired torque command value Tq_req is a positive value (step S13). If the torque command value Tq_req is zero, i.e., if the torque command value Tq_req is not the positive value (S13/No), the diagnosis unit 69 ends the process of the present routine.

In contrast, if the torque command value Tq_req is the positive value (S13/Yes), the detection value I_b of the output current of the battery 21 acquired by the battery information acquisition unit 63 and detection values Tq_det_LF, Tq_det_RF, Tq_det_LR, and Tq_det_RR of the drive torques transmitted to the respective wheels 3LF, 3RF, 3LR, and 3RR and detected by the force sensor output detection unit 65 are acquired (step S15). The detection values Tq_det_LF, Tq_det_RF, Tq_det_LR, and Tq_det_RR of the drive torques transmitted to the respective wheels 3LF, 3RF, 3LR, and 3RR are detected as the moments around the axes in the y direction outputted from the force sensors 11LF, 11RF, 11LR, and 11RR.

Thereafter, the diagnosis unit 69 determines whether the acquired detection value I_b of the output current of the battery 21 is a positive value (step S17). If the detection value I_b of the output current of the battery 21 is zero, i.e., if the detection value I_b of the output current of the battery 21 is not the positive value (S17/No), the diagnosis unit 69 sets an abnormality flag of the communication and transmission circuits (step S19), and ends the process of the present routine. In this case, the diagnosis unit 69 determines that the abnormality is present at the communication system because of a state in which the output current from the battery 21 is absent regardless of the presence of the input of the torque command value Tq_req of the control system 10 as a whole, and ends the process of the present routine because of a state in which a subsequent abnormality diagnosis process is not executable.

In contrast, if the detection value I_b of the output current of the battery 21 is not the positive value (S17/Yes), whether sum Tq_det_tl of the acquired detection values Tq_det_LF, Tq_det_RF, Tq_det_LR, and Tq_det_RR of the drive torques is a positive value (step S21). If the sum Tq_det_tl of the detection values Tq_det_LF, Tq_det_RF, Tq_det_LR, and Tq_det_RR of the drive torques is zero, i.e., if the sum Tq_det_tl of the detection values Tq_det_LF, Tq_det_RF, Tq_det_LR, and Tq_det_RR of the drive torques is not the positive value (S21/No), the diagnosis unit 69 sets an abnormality flag of the control system that includes the inverter unit 30 and the drive motor 7 (step S23), and ends the process of the present routine. In this case, the diagnosis unit 69 determines that the abnormality is generated at anywhere of the inverter unit 30 and the drive motor 7 because of a state in which the drive torque is not outputted regardless of the presence of the input of the torque command value Tq_req of the control system 10 as a whole and the presence of the output current from the battery 21, and ends the process of the present routine because of a state in which a subsequent abnormality diagnosis process is not executable.

In contrast, if the sum Tq_det_tl of the detection values Tq_det_LF, Tq_det_RF, Tq_det_LR, and Tq_det_RR of the drive torques is the positive value (S21/Yes), the diagnosis unit 69 determines a shift of a torque-current characteristic for each of the drive motors 7LF, 7RF, 7LR, and 7RR (step S25).

FIG. 5 is a flowchart illustrating a process of determining the shift of the torque-current characteristic.

First, the diagnosis unit 69 calculates supply currents I_inv_LF, I_inv_RF, I_inv_LR, and I_inv_RR of the respective inverter circuits 31LF, 31RF, 31LR, and 31RR, on the basis of the detection value I_b of the output current of the battery 21 acquired in step S15 and a distribution ratio of the torque command values Tq_req of the respective drive motors 7 (step S51). Specifically, the diagnosis unit 69 determines the distribution ratio of the torque command values by referring to the torque command values Tq_req_LF, Tq_req_RF, Tq_req_LR, and Tq_req_RR of the four drive motors 7LF, 7RF, 7LR, and 7RR calculated by the command torque calculation unit 61. In addition, the diagnosis unit 69 multiplies each detection value I_b of the output current of the battery 21 by the distribution ratio to calculate the supply currents I_inv_LF, I_inv_RF, I_inv_LR, and I_inv_RR of the respective inverter circuits 31LF, 31RF, 31LR, and 31RR.

Thereafter, the diagnosis unit 69 determines the actual torque-current characteristic for each of the drive motors 7, on the basis of the calculated supply current I_inv and the drive torque Tq_det acquired in step S15 (step S53). Specifically, the diagnosis unit 69 calculates the actual torque-current characteristic that indicates the relationship between the supply current I_inv and the drive torque Tq_det, by referring to at least one data on the supply current I_inv and the drive torque Tq_det recorded in the storage 53. In a case where many pieces of data on the supply current I_inv and the drive torque Tq_det are present, the diagnosis unit 69 may determine an approximate line that indicates a characteristic of the drive torque Tq_det with respect to the supply current I_inv. However, in the present embodiment, at least a point of data is to be also referred to as the actual torque-current characteristic.

Thereafter, the diagnosis unit 69 determines the shift between the reference torque-current characteristic and the calculated actual torque-current characteristic by referring to the reference torque-current characteristic map recorded in the storage 53 (step S55). The reference torque-current characteristic map is a map for setting the target supply current I_tgt from the torque command value Tq_req of each of the drive motors 7, and is determined on the basis of specifications of the drive motor 7 and is stored in advance. For example, as illustrated in FIG. 6, in a case where an approximate line C_act of the actual torque-current characteristic has been determined in step S53, the diagnosis unit 69 determines a shift D with respect to a characteristic line CO set in the reference torque-current characteristic map.

In a case where the recorded data on the supply current I_inv and the drive torque Tq_det is only one point, the shift D of the characteristic may be a difference (Tq_det−Tq_req) between the drive torque Tq_det and the torque command value Tq_req that is with respect to the same supply current I_inv in the reference torque-current characteristic map. In addition, in a case where the recorded data on the supply current I_inv and the drive torque Tq_det is a plurality of points, the shift D of the characteristic may be a mean value of the differences (Tq_det−Tq_req) between each of the drive torques Tq_det and the torque command value Tq_req that is with respect to the same supply current I_inv in the reference torque-current characteristic map. Further, in a case where the approximate line of the actual torque-current characteristic has been determined, the shift D of the characteristic may be a mean value of differences (Tq_det−Tq_req) between the preset one or the plurality of drive torques Tq_det in the supply current I_inv and the torque command value Tq_req. However, the shift D of the characteristic is not limited to the above-described examples, and may be determined on the basis of any criterion.

Referring back to FIG. 4, the diagnosis unit 69 determines whether the calculated actual torque-current characteristic is appropriate for each of the drive motors 7LF, 7RF, 7LR, and 7RR (step S27). For example, the diagnosis unit 69 may determine that the actual torque-current characteristic is appropriate in a case where the shift D of the characteristic determined in step S55 is less than a predetermined threshold. However, a method of determining whether the actual torque-current characteristic is appropriate is not particularly limited. For example, in a case where the plurality of pieces of stored data on the supply current I_inv and the drive torque Tq_det is present, the actual torque-current characteristic may be determined as being not appropriate in a case where, among all of the pieces of data, the number of pieces of data in which the shift D of the characteristic is equal to or greater than the predetermined threshold is equal to or greater than a predetermined threshold.

If the calculated actual torque-current characteristic is determined as not being appropriate (S27/No), the diagnosis unit 69 sets an abnormality flag of the control parameter of the drive motor 7 and the inverter circuit 31 in which the actual torque-current characteristic is determined as not being appropriate (step S29), and ends the process of the present routine. In contrast, if the calculated actual torque-current characteristic is determined as being appropriate (S27/Yes), the diagnosis unit 69 determines whether the electric vehicle 1 travels (step S31). In the present embodiment, the diagnosis unit 69 determines the electric vehicle 1 as traveling, in a case where the drive force as the component force in the x direction outputted from the force sensor 11 is a value that indicates forward traveling of the electric vehicle 1 on the basis of a preset coordinate system. However, the diagnosis unit 69 may determine whether the electric vehicle 1 travels on the basis of the rotation speed of the wheel 3 or information on a vehicle speed, or may determine whether the electric vehicle 1 travels on the basis of detection data of a sensor that monitors a surrounding of the electric vehicle 1, such as a camera, LiDAR, or a radar sensor. In this case, it is possible to more comprehensively determine a behavior of the electric vehicle 1, and to also provide a determination criterion of the electric vehicle 1 as a whole in place of a determination criterion that is solely based on one wheel.

If the electric vehicle 1 does not travel (S31/No), the diagnosis unit 69 sets an abnormality flag of the machine/mechanic system (step S33), and ends the present routine. In contrast, if the electric vehicle 1 travels (S31/Yes), the diagnosis unit 69 refers to a diagnosis table recorded in the storage 53 and a state of various flags (step S35). The diagnosis table is data for determining an abnormality by comparing the presence of the torque command, the presence of the detection value of the current sensor 25, and the presence of the detection value of the force sensor 11. The diagnosis unit 69 determines the presence of the abnormality using the diagnosis table, on the basis of the torque command value Tq_req, the drive torque Tq_det and the drive force F_det detected by the force sensor 11, and the detection value I_b of the output current detected by the current sensor 25, that are acquired until now.

FIG. 7 illustrates an example of the diagnosis table.

In an above-described example of the control system in which the force sensor is not provided, in a case where the torque command value and the output current of the battery are not both zero or both zero, it has not been possible to detect an abnormality because whether the drive torque to be transmitted to the wheel is appropriate is uncertain even if an abnormality is present at anywhere of a system as a whole (No. 1 and No. 3). In contrast, in the control system 10 according to the present embodiment, even in a case where the torque command value Tq_req and the detection value I_b of the output current of the battery 21 are not both zero or both zero, it is possible to detect an abnormality because it is possible to use the detection value of the force sensor 11.

Specifically, in a case where the torque command value Tq_req and the detection value I_b of the output current of the battery 21 are both positive values (No. 1), the diagnosis unit 69 determines as follows in response to the drive torque Tq_det and the drive force F_det detected by the force sensor 11. The diagnosis unit 69 determines as normal in a case where the drive torque Tq_det and the drive force F_det detected by the force sensor 11 indicate the forward traveling of the electric vehicle 1 on the basis of the preset coordinate system (No. 1-a). The diagnosis unit 69 determines as an abnormality of the machine/mechanic system in a case where the drive torque Tq_det detected by the force sensor 11 is a positive value whereas the drive force F_det detected by the force sensor 11 is zero (No. 1-b), because a state is where the electric vehicle 1 does not travel regardless of the fact that those from the input into the control system 10 to the output are carried out normally. The diagnosis unit 69 determines as an abnormality of the drive system in a case where the drive torque Tq_det detected by the force sensor 11 is zero (No. 1-c and No. 1-d), because a state is where the drive torque Tq_det is not outputted regardless of the fact that the supply of electric power to the inverter unit 30 is carried out in response to the input into the control system 10.

In addition, the diagnosis unit 69 determines as an abnormality of the communication system as with an example of FIG. 2 in a case where the torque command value Tq_req is the positive value whereas the detection value I_b of the output current of the battery 21 is zero (No. 2).

Further, in a case where the torque command value Tq_req and the detection value I_b of the output current of the battery 21 are both zero (No. 3), the diagnosis unit 69 determines as follows in response to the drive torque Tq_det and the drive force F_det detected by the force sensor 11. The diagnosis unit 69 determines as an abnormality of the communication system in a case where the drive torque Tq_det and the drive force F_det detected by the force sensor 11 are both positive values or one of them is the positive value (No. 3-a or No. 3-b), because a state is where the drive torque Tq_det or the drive force F_det is the positive value regardless of the fact that the torque command to the control system 10 is absent and the supply of electric power to the inverter unit 30 is not carried out as well. However, in this case, a possibility of the abnormality of the battery unit 20, the inverter unit 30, or the drive motor 7 can be contemplated as well. The diagnosis unit 69 determines as normal in a case where the drive torque Tq_det and the drive force F_det detected by the force sensor 11 are both zero (No. 3-c), because a state is where, due to the absence of the input into the control system 10, the output is also absent.

It should be noted that a case of No. 1-b in the diagnosis table corresponds to a case where the abnormality flag of the machine/mechanic system is to be set in step S33. In addition, a case of No. 2 in the diagnosis table corresponds to a case where the abnormality flag of the communication system is to be set in step S19. Further, a case of No. 1-c or No. 1-d in the diagnosis table corresponds to a case where the abnormality flag of the drive system is to be set in step S23. Meanwhile, the control parameter abnormality flag to be set in step S29 corresponds to a case of No. 1-a in the diagnosis table, and indicates an abnormality of the control parameter that is indistinguishable by the comparison of the presence of the torque command value Tq_req, the presence of the detection value of the force sensor 11, and the presence of the detection value of the current sensor 25.

If the abnormality is determined as being present on the basis of the diagnosis table, the diagnosis unit 69 sets a corresponding flag in a case where the corresponding flag has not been set (step S37), and ends the process of the present routine. If the flag has been already set in step S19, S23, S29, or S33, a state of the corresponding flag is held.

The diagnosis unit 69 executes the abnormality diagnosis process of the control system 10 as described above. When the various abnormalities are distinguished, the diagnosis unit 69 notifies a driver of the generation of the abnormality. The diagnosis unit 69 performs the notification of the generation of the abnormality by one of or a plurality of means including, for example, a warning sound, voice, image displaying, and a warning lamp. In that case, an abnormality location may be notified together. Alternatively, a record of the abnormality location may be kept such that the abnormality location is understood by a dealer or a repair garage. In addition, in a case where an abnormality of the control system 10 is detected, the diagnosis unit 69 may limit the torque command value Tq_req or the drive torque to be outputted to prevent the electric vehicle 1 from being in a dangerous state.

Further, in a case where the actual torque-current characteristic of each of the drive motors 7 is determined by the diagnosis unit 69, the torque output control unit 67 may correct the target supply currents I_tgt_LF, I_tgt_RF, I_tgt_LR, and I_tgt_RR of the respective drive motors 7LF, 7RF, 7LR, and 7RR, on the basis of the information on the shift between the reference torque-current characteristic and the actual torque-current characteristic.

FIG. 8 is an explanatory diagram illustrating a target supply current correction process.

The torque output control unit 67 determines whether the abnormality flag of the control parameter has been set as a result of the abnormality diagnosis process executed by the diagnosis unit 69 (step S61). If the abnormality flag of the control parameter has not been set (S61/No), the torque output control unit 67 ends the process of the present routine without executing the correction of the target supply currents I_tgt_LF, I_tgt_RF, I_tgt_LR, and I_tgt_RR.

In contrast, if the abnormality flag of the control parameter has been set (S61/Yes), the torque output control unit 67 acquires the torque command values Tq_req_LF, Tq_req_RF, Tq_req_LR, and Tq_req_RR that are caused to be outputted from the respective drive motors 7LF, 7RF, 7LR, and 7RR and calculated by the command torque calculation unit 61 (step S63). Thereafter, the torque output control unit 67 refers to the information on the shift D between the reference torque-current characteristic and the actual torque-current characteristic calculated in step S55 for each of the drive motors 7LF, 7RF, 7LR, and 7RR (step S65).

In addition, the torque output control unit 67 corrects the target supply currents I_tgt_LF, I_tgt_RF, I_tgt_LR, and I_tgt_RR on the basis of the shift D of the characteristic for each of the drive motors 7LF, 7RF, 7LR, and 7RR (step S67). Specifically, as illustrated in FIG. 6, in a case where the inverter circuit 31 is driven on the basis of the target supply current I_tgt obtained from the characteristic line CO of the reference torque-current characteristic map where the torque command value Tq_req of the certain drive motor 7 is equal to Tq_req_a, the drive torque Tq_det to be outputted from the drive motor 7 becomes equal to Tq_det_b, leading to a deficiency of the drive torque. Accordingly, the torque output control unit 67 so corrects a target supply current I_tgt' that the drive torque Tq_det to be outputted from the drive motor 7 becomes the torque command value Tq_req_a.

For example, in a case where the approximate line Cact of the actual torque-current characteristic has been determined, the torque output control unit 67 may determine the target supply current I_tgt on the basis of the approximate line Cact. Alternatively, the torque output control unit 67 may determine a correction amount in which the target supply current I_tgt is multiplied by a proportion of the shift D to the torque command value T_req when the shift D of the characteristic is calculated, and the correction amount may be added to the target supply current I_tgt. However, a method of correcting the target supply current I_tgt is not particularly limited.

As described in the foregoing, the control system 10 according to the present embodiment includes the force sensor 11. Thus, it is possible to distinguish between the abnormality of the machine/mechanic system, the abnormality of the communication system, and the abnormality of the drive system, on the basis of the comparison of the torque command value Tq_req, the detection value of the force sensor 11, and the detection value of the current sensor 25. Accordingly, it is possible to distinguish the abnormality location at a high accuracy in a case where the control system 10 has an abnormality. Hence, it is possible to distinguish which drive motor 7 involves the generation of abnormality in the control system 10 that includes the plurality of drive motors 7. Consequently, it is possible to distinguish whether one of the drive motors 7 involves the generation of the abnormality or the abnormality is generated in the control system 10 as a whole.

A description is given, with reference to FIG. 9, of the fact that it is possible to distinguish which drive motor 7 involves generation of an abnormality. FIG. 9 illustrates the torque command value Tq_req to be inputted to the control system, a vehicle speed V of the electric vehicle 1, the detection value I_b of the output current of the battery 21, the detection value Tq_det_LF of the drive torque to be transmitted to the left front wheel, the detection value Tq_det_RF of the drive torque to be transmitted to the right front wheel, and the sum Tq_det_tl of the right and the left drive torques, in the electric vehicle in which the drive motors are provided for the respective right and left wheels. A horizontal axis represents a time 1.

As illustrated in FIG. 9, simply monitoring the torque command value Tq_req and the detection value I_b of the output current of the battery 21 does not make it possible to distinguish whether a rapid decrease in the output current of the battery 21 at a time t1 is due to an event resulting from settlement of an inrush current of a starting torque with respect to the torque command value Tq_req or due to an abnormality. However, monitoring the detection values Tq_det_LF and Tq_det_RF of the drive torques outputted from the respective drive motors 7LF and 7RF and to be transmitted to the wheels 3LF and 3RF allows for a detection that the drive motor 7LF of the left front wheel 3LF is stopped with respect to the torque command value Tq_req.

In addition, the control system 10 according to the present embodiment includes the force sensor 11. Thus, it is possible to determine the abnormality of the control parameter that cannot be detected simply by comparing the torque command value Tq_req, the detection value of the force sensor 11, and the detection value of the current sensor 25. Hence, it is possible to detect not only an abnormality generated at each component part of the control system 10 but also the abnormality of the control parameter for controlling the drive motor 7.

Further, it is possible for the control apparatus 50 according to the present embodiment to correct the target supply current I_tgt to be supplied to the drive motor 7, on the basis of the shift between the reference torque-current characteristic and the actual torque-current characteristic. Thus, even in a case where the abnormality of the control parameter is generated, it is possible to cause the drive torque corresponding to the torque command value Tq_req to be outputted and to reduce a sense of discomfort of the driver.

Although preferred embodiments of the disclosure have been described in detail in the foregoing with reference to the accompanying drawings, the disclosure is by no means limited to such embodiments. It is apparent that a person having an ordinary skill in the art to which the disclosure pertains readily arrives at various modifications and alterations within the scope of the technical idea as defined by the appended claims. It should be appreciated that they shall obviously fall within the technical scope of the disclosure as well.

DESCRIPTION OF REFERENCE NUMERALS

1: Electric vehicle
3: Wheel
5: Axle
7: Drive motor
8a: Accelerator pedal sensor
10: Control system
11: Force sensor
20: Battery unit
21: Battery
23: Battery management device
25: Current sensor
30: Inverter unit
31: Inverter circuit
50: Control apparatus
51: Processing unit
53: Storage
61: Command torque calculation unit
63: Battery information acquisition unit
65: Force sensor output detection unit
67: Torque output control unit
69: Diagnosis unit

The invention claimed is:

1. A control apparatus for an electric vehicle, the electric vehicle including at least one drive motor configured to output a drive torque to a wheel of the electric vehicle, and at least one inverter circuit configured to drive the at least one drive motor by providing current to the at least one drive motor based on a target current value, the control apparatus comprising:
one or more memories configured to store first data including
a first current value of current input to the at least one drive motor, and
a first torque value of torque output by the at least one drive motor according to the current of the first current value; and
one or more processors coupled to:
the one or more memories;
a first sensor configured to detect a current flowing from a battery to the at least one inverter circuit as a second current value; and
a second sensor installed on the wheel and configured to:
detect a torque transmitted from the at least one drive motor to the wheel as a second torque value; and
detect a driving force acting on the wheel in a longitudinal direction of the vehicle as a driving force value;
the one or more processors configured to drive the electric vehicle by controlling the target current value to be directed to the at least one inverter circuit, the target current value being calculated using the first data in accordance with a target torque, the target torque being calculated based on an operation amount of an accelerator pedal of the electric vehicle,
wherein the one or more processors are configured to:
acquire second data including:
the second current value detected by the first sensor; and
the second torque value detected by the second sensor;
detect an abnormality in the electric vehicle when a deviation is greater than or equal to a predetermined threshold, the deviation being calculated based on at least a difference between the first torque value and the second torque value, the first torque value and the second torque value each corresponding to a same current value; and
determine, in response to determining the abnormality, a location of the abnormality based on the target current value, the second current value detected by the first sensor, the second torque value detected by the second sensor, and the driving force value detected by the second sensor.

2. The control apparatus for the electric vehicle according to claim 1, wherein
the at least one drive motor comprises multiple drive motors provided independently on right and left sides of the electric vehicle, and provided on one or both of a front wheel side and a rear wheel side,
the at least one inverter circuit comprises multiple inverter circuits configured to drive the respective drive motors, and
the one or more processors are configured to:
acquire, as the second data, the second current value and the second torque value for each of the drive motors;
calculate, for each of the drive motors, the deviation between the first torque value and the second torque value each corresponding to the same current value; and
detect the abnormality in each of the drive motors when the deviation for the corresponding drive motor is greater than or equal to the predetermined threshold.

3. The control apparatus for the electric vehicle according to claim 1, wherein the one or more processors are configured to correct the target current value to be supplied to the at least one drive motor, on the basis of the deviation between the first torque value and the second torque value each corresponding to the same current value.

4. The control apparatus for the electric vehicle according to claim 1, wherein
the one or more processors are configured to distinguish between an abnormality of a drive system, an abnormality of a communication system, and an abnormality of a mechanical system,
the abnormality of the drive system is an abnormality generated at the inverter circuit and the drive motor,
the abnormality of the communication system is an abnormality generated at communication and transmission between sensors including the first and second sensors and the control apparatus, and
the abnormality of a mechanical system is an abnormality in which the electric vehicle is unable to travel when a drive torque is transmitted to the wheel.

5. The control apparatus for the electric vehicle according to claim 4, wherein
the one or more processors are configured to determine the abnormality of the drive system, when the target torque and the second current value are both positive values, and the second torque value is zero.

6. The control apparatus for the electric vehicle according to claim 4, wherein
the one or more processors are configured to determine the abnormality of the communication system, when the target torque and the second current value are both zero, at least one of the second torque value and the driving force value are positive value.

7. The control apparatus for the electric vehicle according to claim 4, wherein
the one or more processors are configured to determine the abnormality of the mechanical system, when the target torque and the second current value are both positive values, the second torque value is a positive value, and the driving force value is zero.

8. An electric vehicle mounted with a control system of the electric vehicle, the electric vehicle including:
at least one drive motor configured to output a drive torque to a wheel of the electric vehicle;
at least one inverter circuit configured to drive the at least one drive motor by providing current to the at least one drive motor based on a target current value;
a current sensor configured to detect a current value representing current output from a battery to the at least one inverter circuit;
a force sensor installed on the wheel and configured to:
detect a torque transmitted from the at least one drive motor to the wheel as a second torque value; and
detect a force that acts on the wheel in a longitudinal direction of the vehicle as a driving force value; and
a control apparatus configured to control the control system of the electric vehicle, the control apparatus comprising:
one or more memories configured to store first data including
a first current value of current input to the at least one drive motor, and
a first torque value of torque output by the at least one drive motor according to the current of the first current value; and
one or more processors coupled to the one or more memories, the one or more processors configured to drive the electric vehicle by controlling the target current value to be directed to the at least one inverter circuit, the target current value being calculated using the first data in accordance with a target torque, the target torque being calculated based on an operation amount of an accelerator pedal of the electric vehicle,
wherein the one or more processors are configured to:
acquire second data including:
the second current value detected by the current sensor; and
the second torque value detected by the force sensor;
detect an abnormality in the electric vehicle when a deviation is greater than or equal to a predetermined threshold, the deviation being calculated based on at least a difference between the first torque value and the second torque value, the first torque value and the second torque value each corresponding to a same current value; and
determine, in response to determining the abnormality, a location of the abnormality based on the target current value, the second current value detected by the current sensor, the second torque value detected by the force sensor, and the driving force value detected by the force sensor.

9. A non-transitory recording medium in which a computer program being configured to be applied to a control system of an electric vehicle, the electric vehicle including at least one drive motor configured to output a drive torque, and at least one inverter circuit configured to drive the drive motor, the computer program causing one or more processors to execute a process, the process comprising:
driving the electric vehicle by controlling a target current value to be directed to the at least one inverter circuit, the target current value being calculated using first data in accordance with a target torque, the target torque being calculated based on an operation amount of an accelerator pedal of the electric vehicle, the first data including a first current value of current input to the at least one drive motor, and a first torque value of torque output by the at least one drive motor according to the current of the first current value,
acquiring second data including:
a second current value representing current output from a battery to the at least one inverter circuit, the second current value being detected by a first sensor that is (1) installed in the electric vehicle and (2) configured to detect the current from the battery to the at least one inverter circuit as the second current value; and
a second torque value representing torque output from the at least one drive motor to a wheel, the second torque value being detected by a second sensor that is (1) installed in the electric vehicle on the wheel and (2) configured to:
detect a torque transmitted from the at least one drive motor to the wheel as a second torque value; and
detect a driving force acting on the wheel in a longitudinal direction of the vehicle as a driving force value;
detecting an abnormality in the electric vehicle when a deviation is greater than or equal to a predetermined threshold, the deviation being calculated based on at least a difference between the first torque value and the second torque value, the first torque value and the second torque value each corresponding to a same current value; and
determining, in response to determining the abnormality, a location of the abnormality based on the target current value, the second current value detected by the first sensor, the second torque value detected by the second sensor, and the driving force value detected by the second sensor.

\* \* \* \* \*